Nov. 17, 1964

H. FRIEDMAN ET AL 3,157,812

TEFLON COATED PHOTON COUNTER TUBE

Filed April 27, 1962

INVENTORS
HERBERT FRIEDMAN
PETER KING

ATTORNEY

United States Patent Office 3,157,812
Patented Nov. 17, 1964

3,157,812
TEFLON COATED PHOTON COUNTER TUBE
Herbert Friedman, 2643 N. Upshur St., Arlington, Va., and Peter King, 314 Cameron Road, Alexandria, Va.
Filed Apr. 27, 1962, Ser. No. 190,839
4 Claims. (Cl. 313—94)
(Granted under Title 35, U.S. Code (1952), sec. 266)

The invention described herein may be manufactured and used by or for the Government of the United States of America for governmental purposes without the payment of any royalties thereon or therefor.

The present invention is directed to flame detectors and more particularly to means for protecting a flame detector tube from contaminants which affect the operability of the tube as a flame detector.

Heretofore, photon counters or photomultiplier tubes have been used as ultraviolet flame detector tubes. Occasionally, it is necessary to operate these tubes for detection of flames in surroundings in which the tube window becomes covered with dirt and/or oil contaminants which prevent the ultraviolet light from passing through the window of the tube. In this condition, the photomultiplier tube will not be sensitive to the ultraviolet light and therefore will not detect the presence of a flame.

It is therefore an object of the present invention to provide a flame detector which will operate to detect a flame in the vicinity of oil sprays and other surrounding conditions which are normally considered unfavorable.

Another object is to provide an ultraviolet flame detector which is of simple construction, relatively inexpensive and operable under abnormal conditions.

Another object is to provide an ultraviolet flame detector which can be used to study engine exhaust and other such flames as may contain oil therein.

Figure 1:
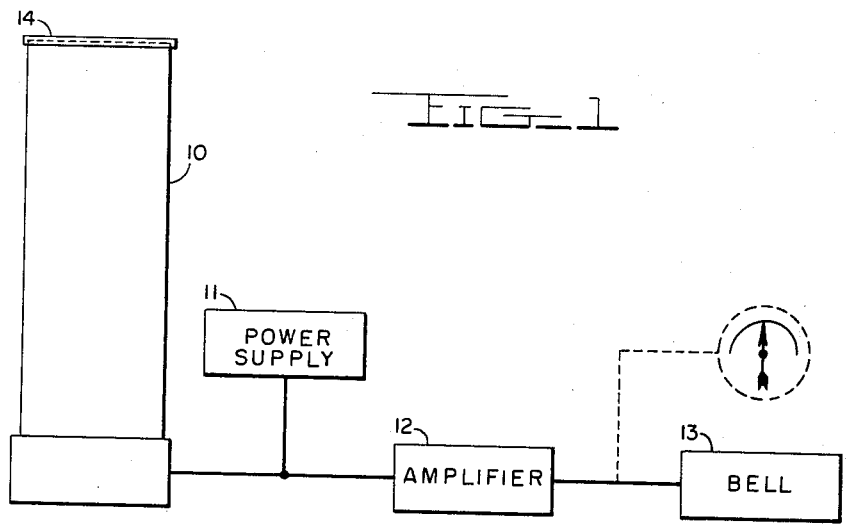
Figure 2:
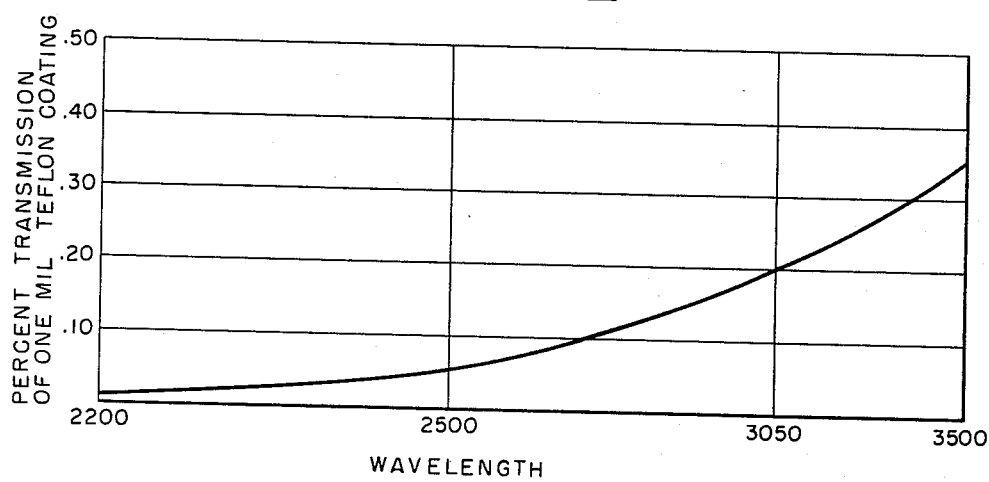

Other objects and advantages of the invention will hereinafter become more fully apparent from the following description of the annexed drawing, in which:

FIG. 1 illustrates a simple flame detector system including a photomultiplier tube with a Teflon coated window; and FIG. 2 is a curve which illustrates the percentage of light passed by a Teflon coating of about one mil thickness for light of different wavelengths.

Now referring to the drawing there is shown by illustration a characteristic ultraviolet light flame detector which includes a photomultiplier tube or photon counter 10, a power supply 11, an amplifier 12 and an indicator 13 which indicates the presence of any ultraviolet light incident on the photocathode or the photomultiplier tube. Such flame detectors can operate only as long as the window of the photomultiplier is free of dirt and contaminants. Dirt and contaminants are opaque to ultraviolet light and will in effect block the passage of ultraviolet light so that there will be no output from the photomultiplier characteristic of the ultraviolet light incident on the window.

In accordance with the present invention an ultraviolet transparent coating 14 of unpigmented polytetrafluoroethylene (Teflon) or any other similar material is applied to the window of the photomultiplier tube. The unpigmented Teflon coating has the characteristics of preventing any dirt, oils or other contaminants from clinging to the surface thereof and will in effect remain clean and transparent to incident light thereby permitting ultraviolet light to be transmitted freely through the coating and the window of the photomultiplier tube. Such an ultraviolet light transparent coating will permit the use of a flame detector in the vicinity of engine exhaust which includes oil and other agents which would contaminate the usual flame detector which does not include the Teflon coating.

It has been determined that unpigmented Teflon coatings having a thickness of from a monolayer to about one mil will transmit ultraviolet light wavelength less than 3000 Angstroms to detect small flames. So-called "solar-blind" detectors do not respond to sunlight and incandescent or fluorescent light in glass envelopes which do not radiate appreciably below about 3000A, but are very sensitive to the ultraviolet light from flames below 3000A.

It is also possible to make the entire window of unpigmented Teflon which can be used for other tubes of greater wavelength. The use of Teflon also permits one to encapsulate a photomultiplier tube in Teflon of a thickness sufficient to protect the tube structure and with a thin coating of Teflon over the window through which the ultraviolet light is transmitted. Thus it is seen that Teflon can protect the tube against damage as well as to prevent the window from becoming contaminated with oil, dirt, etc.

It will be obvious to those skilled in the art that a thin Teflon coating can be applied to the window of any tube window which is operative in the light wavelength range of from about 2200 Angstroms to about 3500 Angstroms as shown in FIG. 2 for a transmittance of from 1% to about 35% for a coating of one mil in thickness. The thickness of the Teflon coating and the sensitivity of the tube dictates the wavelength range of a particular tube. Such tubes can be operated in areas in which oil and dirt are present which would normally interfere with the operability of tubes that do not have a Teflon coated window. Such tubes are useful as fire detectors in areas surrounding aircraft engines, boiler rooms, household fire alarms, as hot box detectors for railroad cars, hot tires on transportation trailers and many other uses where oil and dirt would normally cover the window of a tube to make the tube ineffective as a detector. The Teflon coating on the window of a photon detector tube will prevent any oil and dirt from clinging to the window; therefore, the windows of such tubes will not be affected from coverage by dirt and oil.

Obviously many modifications and variations of the present invention are possible in the light of the above teachings. It is therefore to be understood that within the scope of the appended claims the invention may be practiced otherwise than as specifically described.

What is claimed is:

1. A flame detector which comprises a photomultiplier tube, said photomultiplier tube including a window operable in a desired light waveband, an ultraviolet light transparent unpigmented Teflon coating having a thickness of from a monolayer to about one mil on said window, said Teflon coating being capable of repelling dirt and oil contaminants.

2. A flame detector which comprises a photon tube having a window capable of passing desired light, and a protective coating having a thickness of from a monolayer to about one mil on said window transparent to said desired light, said coating having the characteristics of repelling dirt and oil contaminants incident thereon.

3. A flame detector which comprises a photon tube having a window operable to transmit light in the ultraviolet light waveband, an ultraviolet light transparent coating having a thickness of from a monolayer to about one mil on said window, said coating having the characteristics of repelling dirt and oil contaminants incident thereon.

4. A flame detector as claimed in claim 3 wherein said ultraviolet transparent coating is of unpigmented Teflon.

References Cited in the file of this patent

UNITED STATES PATENTS

| | | |
|---|---|---|
| 2,631,247 | Shaw | Mar. 10, 1953 |
| 2,681,324 | Hochberg | June 15, 1954 |
| 2,787,559 | Coney et al. | Apr. 2, 1957 |